United States Patent [19]

Siemens et al.

[11] 4,258,016
[45] Mar. 24, 1981

[54] PROCESS FOR RECOVERING NI (II), CU (II) AND CO (II) FROM AN AMMONIACAL-AMMONIUM SULFATE LEACH LIQUOR

[75] Inventors: Richard E. Siemens, Albany; David Nilsen, Lebanon; Stanley C. Rhoads, Corvallis, all of Oreg.

[73] Assignee: The United States of America as represented by the Secretary of the Interior, Washington, D.C.

[21] Appl. No.: 125,408

[22] Filed: Feb. 28, 1980

Related U.S. Application Data

[63] Continuation-in-part of Ser. No. 044,434, Jun. 1, 1979, abandoned.

[51] Int. Cl.[3] .................. C01G 3/00; C01G 51/00
[52] U.S. Cl. ........................... 423/24; 423/139; 75/101 BE; C01G/53/00
[58] Field of Search ............... 423/24, 139, DIG. 14

[56] References Cited
U.S. PATENT DOCUMENTS

| | | | |
|---|---|---|---|
| 3,761,249 | 9/1973 | Ritcey | 423/24 |
| 3,929,468 | 12/1975 | Siemens | 423/139 |
| 4,005,173 | 1/1977 | Pemsler | 423/24 |
| 4,065,502 | 12/1977 | MacKay | 423/24 |
| 4,083,915 | 4/1978 | Hubred | 423/139 |
| 4,146,572 | 3/1979 | Cardwell | 423/32 |
| 4,152,396 | 5/1979 | MacKay | 423/139 |

OTHER PUBLICATIONS

Ritcey, G. et al., "Separation of Copper from Nickel and Cobalt by Liquid-Liquid Extraction from Ammoniacol Solutions", *CIM Bulletin,* May 1972, pp. 46–50.

Siemens et al., "Process for Recovery of Nickel, Cobalt and Copper from Domestic Laterites", *Mining Congress Journal,* Jan. 1977, pp. 29–34.

*Primary Examiner*—Brian E. Hearn
*Attorney, Agent, or Firm*—William S. Brown; Donald A. Gardiner

[57] ABSTRACT

There is disclosed a process for recovering nickel (II), copper (II) and cobalt (II) from an ammoniacal-ammonium sulfate leach liquor. This process includes the step of adjusting the pH of the leach liquor prior to co-extracting the nickel and the copper values. Cobalt is recovered as cobalt (II) by reduction of cobalt (III) to cobalt (II) following by an extraction step.

6 Claims, 2 Drawing Figures

LIX 64N Cu-Ni Loading from 300 g/l $(NH_4)_2SO_4$.

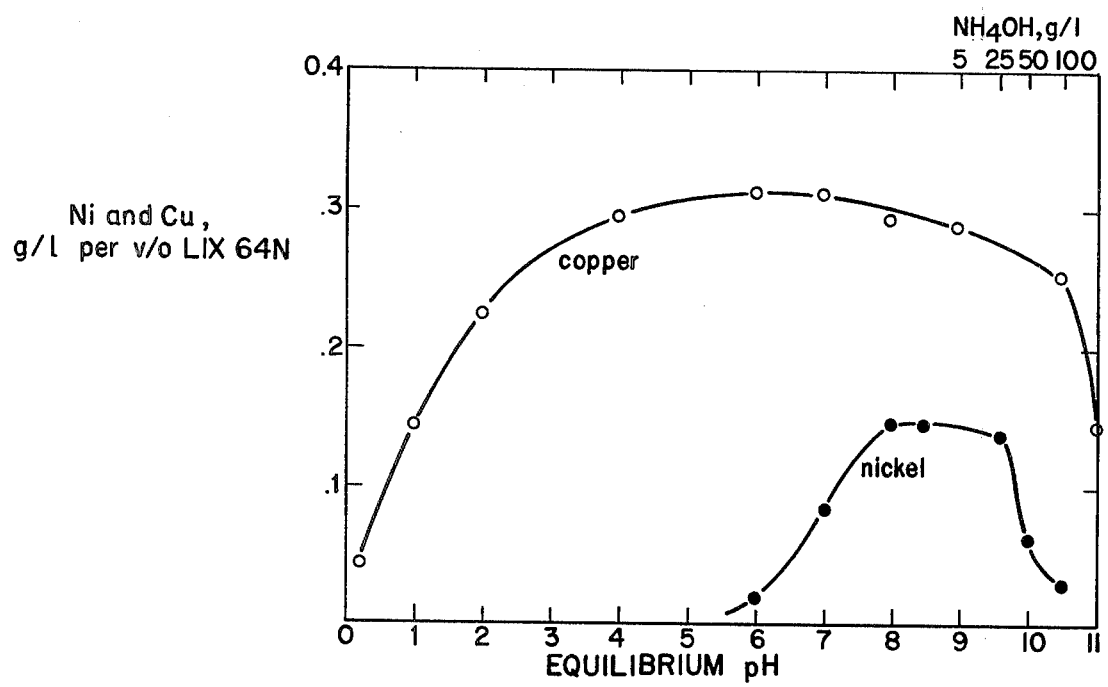
Fig. 1 LIX 64N Cu-Ni Loading from 300 g/l $(NH_4)_2SO_4$.
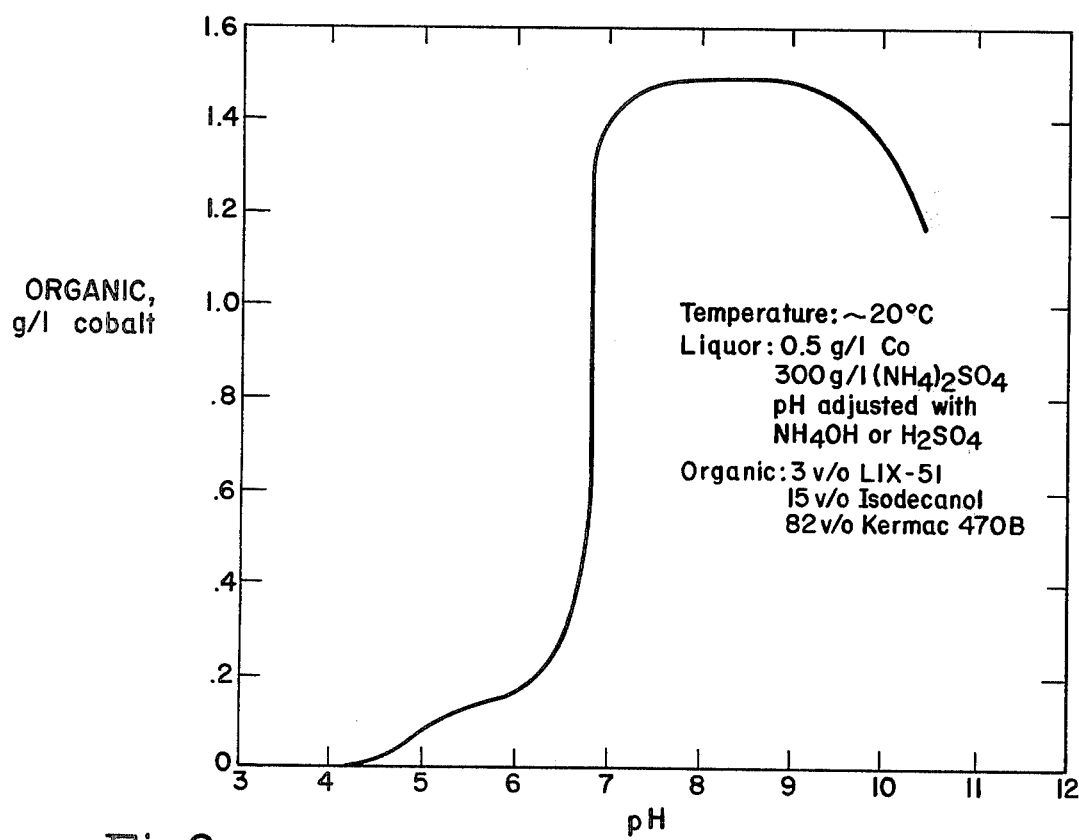
Fig. 2 Cobalt (II) Loading Versis pH.

4,258,016

PROCESS FOR RECOVERING NI (II), CU (II) AND CO (II) FROM AN AMMONIACAL-AMMONIUM SULFATE LEACH LIQUOR

RELATED APPLICATION

This application is a continuation-in-part of application Ser. No. 044,434, filed June 1, 1979, abandoned.

TECHNICAL FIELD

This invention relates to the recovery of nickel, copper and cobalt from an ammoniacal-ammonium sulfate leach liquor, and in particular relates to the recovery of these metal values from an ammoniacal-ammonium sulfate leach liquor produced from laterites containing less than 1.2% nickel.

BACKGROUND ART

It is known to use an ammoniacal-ammonium sulfate leach for the recovery of nickel, copper and cobalt values from the oxide ores of nickel and cobalt, which are commonly referred to as lateritic ores. Exemplary of this type of art is U.S. Pat. No. 3,929,468 to Siemens et al, which discloses a selective reduction, oxidizing-ammonia leach process.

It is also known in the prior art to co-extract nickel (II) and copper (II) from an ammoniacal-ammonium sulfate leach liquor produced by the selective reduction, oxidizing-ammonia leach process of U.S. Pat. No. 3,929,468, by use of LIX-64N as the extracting agent, and then to separately recover nickel (II) and copper (II) from the LIX-64N by using spent nickel and copper electrolytes. Furthermore, it is known to recover cobalt (III) from the nickel-copper-free raffinate remaining after nickel and copper co-extraction, by extraction of the raffinate with a β-diketone; to strip the cobalt (III) from the β-diketone along with any zinc (III) present, by using spent cobalt electrolyte; and to separate any zinc (II) with di-(2-ethylhexyl) phosphoric acid. This type of prior art is illustrated by R. E. Siemens and J. D. Corrick, "Process for Recovery of Nickel, Cobalt and Copper from Domestic Laterites", *Mining Congress Journal*, pages 29–34 (Jan. 1977).

Additionally, the conversion of cobalt (III) to cobalt (II) by contact of the trivalent cobalt with cobalt metal is generally known, as illustrated at column 13, lines 50–57, of U.S. Pat. No. 3,929,468. In this patent, LIX-64N is used to extract the divalent cobalt.

Finally, variation of LIX-64N nickel-loading capacity with ammonia content is described by C. R. Merigold and R. B. Sudderth, "Recovery of Nickel by Liquid Ion Exchange Technology", *Ch. in Internat. Symp. on Hydrometallurgy*, ed. by D. J. I. Evans, R. S. Shoemaker, pages 552–588 (AIME, N.Y. 1973). This work involves the use of an ammonia-ammonium carbonate system for nickel recovery, and for this system, optimum nickel-loading capacity exists when the ammonia content is high.

This prior art is deficient because these approaches have failed to optimize recovery of the nickel, copper and cobalt metal values. Furthermore, when LIX-64N is used to extract cobalt (II), it is difficult to strip the cobalt (II) from the LIX-64N, and in fact, a stripping agent such as hydrogen sulfide is necessary. Use of hydrogen sulfide has the disadvantage of producing a precipitate with poor handling properties, of introducing sulfide ions into the leach solution, and yielding an impure sulfide precipitate which must be further refined.

DISCLOSURE OF THE INVENTION

It is accordingly one object of the present invention to provide a process that optimizes the recovery of nickel, copper and cobalt values from an ammoniacal-ammonium sulfate leach liquor.

A further object of the present invention is a cobalt recovery process that permits the cobalt ion to be easily stripped from the extracting agent.

Other objects and advantages of the present invention will become apparent as the description thereof proceeds.

In satisfaction of the foregoing objects and advantages, there is provided by this invention a process for improving the recovery of nickel (II) and copper (II) from an ammoniacal-ammonium sulfate leach liquor containing nickel (II), copper (II) and cobalt (III). This process includes the step of adjusting the pH of the leach liquor to a value of from about 6.75 to about 10 by stripping ammonia from the leach liquor. Nickel (II) and copper (II) are co-extracted from the pH-adjusted leach liquor with an extracting agent containing about 46 to about 50% of a β-hydroxybenzophenone oxime, and about 1 to about 2% of an aliphatic α-hydroxy oxime in a kerosene diluent, the pregnant extracting agent is washed to remove sorbed ammonia, and nickel (II) and copper (II) are separately recovered from the extracting agent by use of spent nickel and copper electrolytes. There is also provided by the present invention, a process for recovering cobalt (II) from the nickel-copper-free raffinate remaining after the nickel-copper co-extraction. This process includes the steps of (a) converting cobalt (III) to cobalt (II), (b) extracting the cobalt (II) with an extracting agent comprising a β-diketone chelating metal extractant, (c) washing the pregnant extracting agent to remove sorbed ammonia, and (d) recovering the cobalt (II) from the extracting agent.

BRIEF DESCRIPTION OF THE DRAWING

Reference is hereby made to the accompanying drawing which forms a part of the specification of the present invention.

FIG. 1 depicts an extraction curve for copper (II) and nickel (II) using LIX-64 as the extracting agent.

FIG. 2 depicts an extraction curve for cobalt (II) using a β-diketone as the extracting agent.

BEST MODE FOR CARRYING OUT THE INVENTION

As indicated above, the present invention is concerned with a process for recovering nickel (II) and copper (II) from an ammoniacal-ammonium sulfate leach liquor, and further is concerned with a process for recovering cobalt (II) from the nickel-copper-free raffinate remaining after co-extraction of nickel-copper from the leach liquor. The ammoniacal-ammonium sulfate leach liquor used as the starting material for the process of the present invention is obtained, for example, by the selective reduction, oxidizing-ammonia leach process of U.S. Pat. No. 3,929,468. The disclosure of this patent pertaining to the selective reduction, oxidizing-ammonia leach process thereof is hereby incorporated by reference into this application. As the starting material for that process, there may be used any lateritic ore and any of the various minerals and ore concentrates described at column 3, line 62 to column 4, line 7 of U.S. Pat. No. 3,929,468. All these materials are useful for producing the ammoniacal-ammonium sulfate leach liquor starting material used in the process of this invention. The process of this invention is particularly useful for recovering nickel, copper and cobalt values from low grade laterites that contain less than 1.2% nickel.

According to the present invention, an ammoniacal-ammonium sulfate leach liquor containing nickel (II), copper (II) and cobalt (III) is adjusted to a pH value of from about 6.75 to about 10 by stripping ammonia from the leach liquor. FIG. 1 represents our discovery as to the relationship between ammonia concentration, pH, and nickel and copper loading onto an extracting agent such as LIX-64N. This Figure shows that as pH is adjusted away from the ammoniacal side of the curve, a marked increase in nickel and copper loading onto LIX-64N is observed, for an ammoniacal-ammonium sulfate system. This result is quite unexpected and surprising in view of the experimentation of Merigold and Sudderth, mentioned earlier. They found that in an ammonia-ammonium carbonate system, nickel loading is at its optimum on the ammoniacal side. In our ammoniacal-ammonium sulfate system, we have discovered that a pH value of from about 6.75 to about 10 results in a better extraction of nickel (II) and copper (II) than is obtained on the ammoniacal side of the curve depicted. A preferred pH range for co-extraction of copper (II) and nickel (II) is about 7.25 to about 9.75, and a very preferred pH range is from about 8.0 to about 9.6.

Although we are particularly concerned with co-extraction of nickel and copper values in our invention, it would be obvious to adjust the pH to a value of about 6 in order to obtain maximum copper (II) extraction in the event the leach liquor did not contain nickel (II), or in the event it was decided to preferentially extract copper (II).

The ammoniacal-ammonium sulfate leach liquor used as a starting material in this process contains from about 50 to 400 gpl ammonium sulfate, and from about 25 to 150 gpl ammonia, with about 300 gpl ammonium sulfate and 50 gpl ammonia providing an optimum leaching effect for most ores. As can be seen from FIG. 1, about 10 to 20 gpl of ammonia corresponds to a pH of about 9.2 to 9.6.

In adjusting the pH of the leach liquor to a value of from about 6.75 to about 10 by stripping ammonia from the leach liquor, any conventional process may be used. For example, the ammonia may be removed by steam stripping, heating or air sparging. In the event the selective reduction, oxidizing-ammonia leach process is also being carried out, the stripped ammonia may be recycled to the leach solution used in that process.

An extracting agent is then used to coextract nickel (II) and copper (II) from the pH-adjusted leach liquor. Exemplary extracting agents for use in this step are the oximes disclosed at column 4, line 24 to column 6, line 57 of U.S. Pat. No. 3,855,090 and at column 5, line 24 to column 8, line 8 of U.S. Pat. No. 3,853,725. These portions of these two patents are hereby incorporated by reference into this application. A preferred extracting agent is marketed by General Mills under the designation LIX-64N. This agent contains about 46 to 50% β-hydroxybenzophenone oxime, and about 1 to about 2% of an aliphatic α-hydroxy oxime in a hydrocarbon diluent such as kerosene. This extracting agent provides nearly quantitative extraction of nickel and copper and provides a very high degree of selectivity for nickel (II) and copper (II) over cobalt (III). When LIX-64N is selected as the extracting agent, a preferred formulation contains an about 11–13 volume % solution of LIX-64N in kerosene, with a 12 volume % solution being particularly preferred.

A countercurrent system of mixers and settlers is used for co-extraction of the nickel and copper values, and for stripping the nickel and copper values from the pregnant extracting agent. The nickel-copper co-extraction advantageously involves the use of three stages. The first two stages are countercurrent and produce the nickel-copper-free raffinate, and the third stage is cocurrent and maximizes nickel loading and crowds or displaces any zinc (II) that may be present off the extracting agent.

The nickel-copper co-extraction is suitably carried out at a temperature of about 35° to 45° C., with a temperature of about 40° C. being particularly suitable.

The pregnant extracting agent is washed to remove sorbed ammonia. Suitably, the washing is carried out in a mixer-settler, and there is used as the washing solution dilute sulfuric acid in ammonium sulfate. Advantageously, the washing solution has a pH from about 3.0 to 4.0, with a pH of about 3.2 being particularly advantageous.

Nickel (II) recovery is suitably carried out using spent nickel electrolyte. This recovery step advantageously involves three countercurrent stages. Suitably, copper (II) is recovered in a mixer-settler using spent copper electrolyte. In each case, there is recovered a metal value of cell-grade purity that may be used as a feed in an electrowinning step.

By the process of the present invention, there is obtained a co-extraction of about 99% of the nickel and about 97% of the copper from an ammoniacal-ammonium sulfate leach liquor, with a recovery from the leach liquor of about 92% nickel and about 82% copper.

Also according to the present invention, there is provided a process for recovering cobalt (II) from the nickel-copper-free raffinate remaining after the nickel-copper co-extraction step. By the first step of this process, cobalt (III) is converted to cobalt (II). Suitably, this step is carried out by pumping the nickel-copper-free raffinate up through a bed of cobalt shot contained in a sealed column. The raffinate overflows at the top of the bed into a discharge tube. Air is excluded from the reduction column or the cobalt shot would be leached at a very high rate. Also, some cobalt (II) would be oxidized to cobalt (III). This reduction step is suitably carried out at about room temperature.

It is preferred that agitation be supplied to the cobalt shot bed during this step. Suitably, the cobalt shot bed is agitated by continuously introducing argon gas at the bottom of the column. Agitation results in a higher conversion of cobalt (III) to cobalt (II), reduces the time required for completing this step, and produces an overall greater extraction of the cobalt. In carrying out this step, the raffinate is retained in the reduction column for a period of time in the range of about 8 to 32 minutes. When agitation is used, a preferred period of time is about 11 to 13 minutes, since this produces an overall cobalt extraction of about 93%. A longer residence time may, of course, be used since overall extraction does increase with a longer residence time, but the increase in overall extraction amounts to only about 4% when a residence time of about 32 minutes is used.

When agitation is not used, a residence time longer than about 11 to 13 minutes is somewhat more advantageous since the overall cobalt extraction increases from about 79% at about 12 minutes, to about 88% at about 32 minutes.

The raffinate flow rate and dimension of the cobalt shot bed are selected to provide the desired retention time, with a lower flow rate and a deeper bed producing a relatively longer retention time than a faster flow rate and a shallower bed. The retention time is determined by measuring the void volume of the bed and the flow rate of the raffinate.

As a result of this reduction step, the cobalt shot acquires a black coating. However, no significant decrease in efficiency occurs even when the cobalt shot has a very black coating. Much of the coating can be removed by wet tumbling of the shot in a mill, with a dilute sulfuric acid solution (about 11 gpl) being more effective than just water in the tumbling treatment. However, use of a dilute sulfuric acid solution rather than water does result in leaching of some cobalt shot. During shut-down periods, it is advantageous to keep the column full of nickel-copper-free raffinate.

The cobalt (II) is then extracted with an extracting agent containing a $\beta$-diketone chelating metal extractant. The preferred extractant is a $\beta$-diketone of the formula

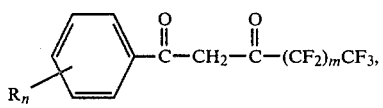

where n is 1 to 4, m is 0, 1 or 2 and R is an alkyl group of 1–25 carbon atoms. These compounds and their preparation are disclosed in U.S. Pat. No. 4,152,396, the disclosure of which is also incorporated herein by reference.

Suitably, the $\beta$-diketone chelating metal extractant is dissolved in an alcohol and in a hydrocarbon, such as kerosene. Advantageously, the alcohol contains about 10 carbon atoms with isodecanol being preferred. A preferred hydrocarbon is kerosene containing about 12 to 15% aromatic hydrocarbons. Illustrative of this preferred hydrocarbon is Kermac 470B®, which is marketed by Kerr-McGee. The ratio of $\beta$-diketone chelating metal extractant to alcohol to hydrocarbon to be used is governed by considerations such as speed of and completeness of phase separation, and the concentration of cobalt in the liquor to be extracted. When isodecanol and Kermac 470B® are selected for use as the alcohol and the hydrocarbon, respectively, the optimum isodecanol concentration is about 15 volume %, with a concentration in the range of about 10 to 20 volume % being operative.

The maximum loading capacity of cobalt (II) on the $\beta$-diketone extractant is about 1.5 gpl. At this level, no precipitation occurs in the organic phase. When a laterite ore is used to produce the ammoniacal-ammonium sulfate leach liquor, an about three volume percent concentration of the $\beta$-diketone extractant in the alcohol and hydrocarbon is suitable for fully loading the low concentration of cobalt normally encountered. Thus, the preferred embodiment of the extracting agent for use on raffinates produced from laterite ores contains about three volume percent $\beta$-diketone, about 15 volume percent isodecanol and about 82 volume percent Kermac 470B®.

Suitably, the extraction step is carried out at a temperature in the range of from about room temperature to about 40° C., and is carried out in one or two stages. A one-stage cocurrent extraction may be used.

The loading of cobalt (II) on the $\beta$-diketone extractant is strongly pH dependent. FIG. 2 represents our discovery of the effect of pH and free ammonia concentration on the loading of cobalt (II) on the $\beta$-diketone extractant. Cobalt (II) begins to load just above about pH 4.5, with maximum loading taking place between pH 7.5 and 9.0. Thus, pH adjustment by stripping ammonia from the leach liquor prior to co-extraction of nickel and copper values aids cobalt (II) extraction. If necessary, the pH may be further adjusted at this time by the addition of sulfuric acid or ammonium hydroxide, depending upon whether the pH needs to be adjusted downward or upward.

The pregnant organic phase produced by the extraction step is then washed to remove ammonia. A dilute acid wash or a water-ammonium sulfate solution is used for the ammonia removal. A water-ammonium sulfate solution is preferred over a dilute acid wash. Use of a 120 gpl ammonium sulfate wash solution optimizes both ammonia removal and phase separation of the wash solution from the organic layer. Two countercurrent wash stages typically remove 70–80% of the total ammonia from the pregnant organic. Any remaining ammonia is then removed by a pH-controlled wash stage. Suitably, this wash stage is carried out using a sulfuric acid-ammonium sulfate wash solution having a pH from about 5.5 to about 6.0.

After the ammonia-removal step, cobalt (II) is stripped from the extracting agent by use of spent cobalt electrolyte. An equilibrium pH below about 3.0 in the spent cobalt electrolyte results in essentially complete stripping of the cobalt (II) with one stage stripping being quite effective. A very suitable strip solution contains about 77.3 gpl cobalt and 18.3 gpl sulfuric acid. An equilibrium pH of about 2.8 in the spent cobalt electrolyte is preferred for the stripping step.

Any zinc present in the ore used to produce the ammoniacal-ammonium sulfate leach liquor is also extracted by the $\beta$-diketone extractant and is stripped therefrom by the spent cobalt electrolyte. This zinc (II) is removed from the strip solution with di-(2-ethylhexyl)-phosphoric acid and recovered as zinc sulfate. A particularly suitable composition for this purpose contains about 20% di-(2-ethylhexyl) phosphoric acid in about 5% tributyl phosphate (TBP) and about 75% kerosene.

By this process, about 94% of the cobalt is extracted from the nickel-copper-free raffinate, and there is obtained a cell-grade cobalt electrolyte.

Specific examples of the present invention will now be set forth. Unless otherwise stated, all percentages are by weight. Furthermore, unless otherwise indicated, all processing steps are conducted at ambient temperature and pressure. It is to be understood that these examples are merely illustrative and in no way are to be interpreted as limiting the scope of the invention.

EXAMPLE I

The pH of an ammoniacal-ammonium sulfate leach liquor produced by the selective reduction, oxidizing-ammonia leach process of U.S. Pat. No. 3,929,468 is adjusted by the removal of ammonia from the liquor until only 17.8 gpl ammonium hydroxide remains. The ammonia is removed by steam stripping. The pH-adjusted leach liquor containing 1.00 gpl nickel (II), 0.30 gpl cobalt (III), 0.03 gpl copper (II), 0.02 gpl zinc (II), and 294 gpl ammonium sulfate is extracted with 12 volume percent LIX-64N in Kermac 470B®. The extraction is carried out at 40° C. Three 620ml mixer-settler stages are used for the extraction, with the first two stages being countercurrent and the third stage being cocurrent. The resulting raffinate contains 0.30 gpl cobalt (III), 0.02 gpl zinc (II), 0.01 gpl nickel (II), and less than 0.001 gpl copper (II).

The loaded extracting agent is then passed to a wash circuit for removal of sorbed ammonia. In a mixer-settler, the extracting agent is washed with pH 3.2 sulfuric acid in 250 gpl ammonium sulfate.

Nickel (II) is selectively stripped from the extracting agent in three countercurrent stages with spent nickel electrolyte containing 83 gpl nickel and about 5 gpl sulfuric acid. After the nickel stripping, 0.04 gpl nickel is left, and the pregnant electrolyte produced contains about 90 gpl nickel at pH 2. Copper (II) is stripped in one mixer-settler with spent copper electrolyte containing 25 gpl copper and 180 gpl sulfuric acid. After the copper stripping, 0.005 gpl copper remains.

EXAMPLE II

The nickel-copper-free raffinate produced by the nickel-copper co-extraction step of Example I is pumped up through a bed of cobalt shot contained in a sealed column and allowed to overflow at the top of the cobalt shot bed into a discharge tube. Air is excluded from the column. Agitation is supplied to the cobalt shot bed by introducing argon gas at the bottom of the column. The residence time of the raffinate in the column is 12 minutes.

The cobalt (II)-containing raffinate is then extracted with an extracting agent containing three volume percent of the above-described β-diketone extractant, 15 volume percent isodecanol, and 82 volume percent Kermac 470B®. The pregnant extracting agent is washed with a 120 gpl ammonium sulfate wash solution using two countercurrent wash stages, and then residual ammonia is removed with a sulfuric acid-ammonium sulfate wash solution having a pH of 5.5 to 6.0. The washed pregnant extracting agent is stripped with a spent cobalt electrolyte having a pH of 2.8 and containing 77.3 gpl cobalt and 18.3 gpl sulfuric acid. The pregnant electrolyte produced is stripped of zinc (II) by extraction with a composition containing 20% di-(2-ethylhexyl) phosphoric acid, 5% TBP and 75% kerosene. There is obtained cell-grade cobalt electrolyte.

What is claimed is:

1. A process for recovery of nickel, copper and cobalt from an ammoniacal-ammonium sulfate leach liquor containing nickel(II), copper(II) and cobalt(III) comprising:
   (1) adjusting the pH of said leach liquor to about 8.0 to 9.6 by stripping ammonia therefrom,
   (2) co-extracting nickel and copper from the leach liquor by means of an extracting agent comprising about 46 to 50% of a β-hydroxybenzophenone oxime and about 1 to 2% of an aliphatic α-hydroxy oxime in a hydrocarbon diluent,
   (3) washing the loaded extracting agent to remove sorbed ammonia, and recovering nickel and copper from the washed extracting agent,
   (4) treating the raffinate from the co-extraction of step (2) to convert cobalt(III) to cobalt(II), and to adjust the pH of the raffinate to about 7.5 to 9.0,
   (5) extracting cobalt(II) from said raffinate by means of an extracting agent comprising a β-diketone chelating metal extractant of the formula

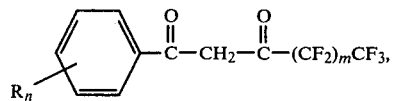

where n is 1 to 4, m is 0, 1 or 2 and R is an alkyl group of 1-25 carbon atoms, and
   (6) washing the loaded extracting agent to remove sorbed ammonia, and recovering cobalt from the washed extracting agent.

2. The process of claim 1 wherein the cobalt (II) recovery is by use of a spent cobalt electrolyte.

3. The process of claim 1 wherein said extracting agent comprises said metal extractant, a ten carbon alcohol, and kerosene.

4. The process of claim 3 wherein the alcohol is isodecanol and the kerosene contains 12 to 15% aromatic hydrocarbons.

5. The process of claim 4 wherein said extracting agent consists of about 3 volume % of said metal extractant, about 15 volume % isodecanol and about 82 volume % kerosene containing 12 to 15% aromatic hydrocarbons.

6. The process of claim 1 in which the initial ammoniacal-ammonium sulfate leach liquor contains about 300 gpl ammonium sulfate and about 50 gpl ammonia.

* * * * *